(12) United States Patent
Hacikyan

(10) Patent No.: US 7,112,358 B1
(45) Date of Patent: Sep. 26, 2006

(54) SELF-ADHESIVE PURGE DAM FOR RETAINING PURGE GAS AROUND A WELD ZONE

(76) Inventor: Michael Hacikyan, 1576 Sweet Home Rd., Amherst, NY (US) 14228

(*) Notice: Subject to any disclaimer, the term of this patent is extended or adjusted under 35 U.S.C. 154(b) by 32 days.

(21) Appl. No.: 10/837,899

(22) Filed: May 3, 2004

(51) Int. Cl.
B32B 9/00 (2006.01)

(52) U.S. Cl. .................. 428/40.1; 138/89; 138/94; 219/61; 219/74; 228/42; 228/49.3; 228/219; 428/41.7; 428/41.8; 428/42.2; 428/43; 428/119; 428/192; 428/194

(58) Field of Classification Search ............. 428/40.1, 428/41.7, 41.8, 42.2, 43, 119, 192, 194; 138/89, 138/94; 228/42, 49.3, 219; 219/61, 74
See application file for complete search history.

(56) References Cited

U.S. PATENT DOCUMENTS

| | | | |
|---|---|---|---|
| 3,736,400 A * | 5/1973 | Spiegel et al. ............ 219/60 A |
| 4,916,281 A | 4/1990 | Flasche et al. ............ 219/61 |
| 5,187,343 A * | 2/1993 | Edwards .................... 219/74 |
| 5,390,846 A | 2/1995 | Thode ....................... 228/219 |
| 5,583,305 A | 12/1996 | Hirsch et al. ............. 73/865.8 |
| 5,669,547 A | 9/1997 | Spring ..................... 228/219 |
| 5,785,235 A * | 7/1998 | Beatty ...................... 228/42 |
| 2004/0022676 A1 | 2/2004 | Hamilton et al. ............ 422/37 |
| 2005/0072809 A1* | 4/2005 | Pantelleria et al. .......... 222/327 |

OTHER PUBLICATIONS

AB Paper Co., Shur-Purge, Jan. 1, 1997, 5 pages.
Intercon, Water-Soluble Purge Paper, Oct. 1, 2002, 5 pages.
Gilbreth, Dissolvo, 2001, 8 pages.

* cited by examiner

Primary Examiner—Nasser Ahmad
(74) Attorney, Agent, or Firm—Walter W. Duft

(57) ABSTRACT

A self-adhesive purge dam for retaining purge gas around a weld zone includes a base configured to substantially obstruct an air passage leading to the weld zone and an adhesive skirt extending from the base and configured to engage portions of the air passage. An adhesive on the adhesive skirt allows the skirt to be adhered to the air passage. An optional removable backing covers the adhesive prior to installation. The purge dam is installed by peeling the removable backing (if present) and exposing the adhesive for adhesion.

47 Claims, 16 Drawing Sheets

SELF-ADHESIVE PURGE DAM FOR RETAINING PURGE GAS AROUND A WELD ZONE

FIELD OF THE INVENTION

The present invention relates generally to inert gas welding. More particularly, the invention is directed to purge dam constructions for retaining purge gas around a weld zone.

DESCRIPTION OF PRIOR ART

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding or socket-welding the ends of two pipe sections to form a consolidated pipe run, two purge dams are placed in the pipes, one in each pipe on either side of the weld zone. A purge gas can then be introduced into the area between the dams, usually by way of a needle injector inserted through a gap in the pipe end interface to be welded, to drive off the atmospheric contaminants.

Conventional purge dams for pipe welding applications must sometimes be placed relatively far from the weld zone so that they are accessible for removal following welding. In the example above where the ends of two pipe sections are welded together, the purge dams would need to be placed proximate to the ends of the pipes that remain exposed following welding. Such remote placement may require that large amounts of purge gas be introduced to fully decontaminate the weld zone.

To overcome the foregoing problem, it has been proposed that purge dams be formed using water soluble paper. The advantage of water soluble purge dams is that they can be placed in close proximity to a weld zone, and then removed following welding by dissolving them with water introduced through the pipe. Insofar as pipe systems typically undergo hydrostatic pressure testing or flushing with water prior to use, water soluble purge paper can be used in many cases without any additional processing steps following welding.

In some applications involving small diameter pipe, water soluble purge dams have been formed by simply crumpling a sheet of water soluble paper into a wad and inserting it into the end of a pipe to be welded. For larger diameter pipe, purge dams are conventionally constructed on site by forming a sheet of water soluble paper into a shaped dam structure. Following the construction of such a dam, it is inserted into a pipe end, and water soluble tape is used to affix the dam to the interior pipe wall. According to published descriptions of this technique, the formation of a water soluble sheet into the shaped dam structure entails cutting the sheet into a circle that is several inches larger than the pipe inner diameter, tracing or impressing the pipe inner diameter on the paper, and folding along this line to form a 90 degree lip that engages the pipe wall. The water soluble tape comes from a tape roll that is provided with the paper. After such a dam is placed in a pipe with the lip of the dam facing the open pipe end, several pieces of tape are torn from the tape roll and placed around the lip to secure it to the pipe wall.

A disadvantage of the foregoing do-it-yourself approach is that it requires field-formation of the purge dam to a desired shape, followed by labor-intensive taping of the purge dam to a pipe prior to welding. Paper, scissors and rolls of tape must all be carried to the welding location. In many cases, this could be remote from a supply shed or work shop where such materials are stored, requiring a truck roll to the location. Loss of valuable time will result if any of the required items are forgotten or used up while in the field. A further difficulty is that the structure to be welded may be relatively inaccessible. For example, a pipe structure at a refinery could be many feet above ground, such that it can only be reached by way of a ladder or scaffold. The difficulty and potential danger of carrying purge dam construction materials while climbing to such a location, and thereafter fabricating a purge dam while perched on the ladder or scaffold, are problems that welding personnel generally wish to avoid.

A prefabricated water soluble purge dam has been proposed as an alternative to the do-it-yourself approach described above. This publicized purge dam includes a sheet of water soluble paper that is preformed into a conical shape in which the open end of the cone conforms in diameter to the pipe to be welded. The purge dam is inserted into the pipe with the open end of the cone facing the open end of the pipe. Then, in accordance with the do-it-yourself technique described above, pieces of water soluble tape are torn from a tape roll and used to secure the open end of the cone to the pipe wall. Although this prefabricated water soluble purge dam concept is an improvement over the do-it-yourself technique, it still requires taping. Thus, a roll of tape must again be carried to the job site, perhaps carried up a ladder or scaffold, and pieces of tape must be torn from the roll and applied to the purge dam.

Accordingly, there is presently a need for improvement in the construction of water soluble purge dams. What is required in particular is a water soluble purge dam that is easy to install and which can be used with maximum convenience and safety by welding personnel who may be welding at a remote field location that is miles away from a supply shed or workshop, and potentially in a high risk environment.

SUMMARY OF THE INVENTION

The foregoing problems are solved and an advance in the art is provided by a novel self-adhesive purge dam for retaining a purge gas around a weld zone. The purge dam includes a base configured to substantially obstruct an air passage leading to the weld zone, and an adhesive skirt extending from the base and configured to engage portions of the air passage. An adhesive on the adhesive skirt allows the skirt to be adhered to the air passage. A removable backing may be optionally used to cover the adhesive prior to installation. The purge dam is prepared for installation by peeling the removable backing (if present) and exposing the adhesive for adhesion. The purge dam then simply needs to be positioned within the air passage and secured by pressing the adhesive against the sides thereof.

BRIEF DESCRIPTION OF THE DRAWINGS

The foregoing and other features and advantages of the invention will be apparent from the following more particular description of preferred embodiments of the invention, as illustrated in the accompanying Drawings in which.

DETAILED DESCRIPTION OF PREFERRED EMBODIMENTS

Turning now to the Drawings, which are not necessarily to scale, various alternative self-adhesive purge dam constructions are set forth by way of illustration only to exemplify how the principles of the invention may be implemented in practice. Each of the illustrated constructions includes non-adhesive and adhesive portions. The non-adhesive portions are comprised of materials that are substantially impermeable to purge gas when it is introduced into a weld zone at a normal operational pressure. On the other hand, the materials should be capable of degrading and dispersing when contacted by a chemical agent (e.g., water) or a force (e.g., air or water pressure) that is greater than the operational pressure of the purge gas. Water soluble materials, such as water soluble paper, polyvinyl alcohol film, etc., are examples of materials that may be used, provided the proper thickness or grade is selected to withstand the operational purge gas pressure. A water soluble paper that may be used is sold by Aquasol Corporation of Amherst, N.Y. under the trademark Aquasol®. The Aquasol® brand paper is made of Sodium Carboxy Methyl cellulose and wooden pulp that dissolves rapidly and completely in most liquids, including water. Non-water soluble paper, such as tissue paper, may also be used as a purge dam material provided it has a thickness or grade that is capable of withstanding operational purge gas pressures, yet will rupture when a larger force (e.g., air or water pressure) is applied.

With respect to the adhesive portions of the illustrated purge dam constructions, water soluble adhesive is generally preferred. Such adhesives are sold by Aquasol Corporation and other vendors. Non-water soluble adhesives may also be used if the presence of adhesive residue following purge dam removal can be tolerated. For example, in welding pipe, there may be applications where the presence of adhesive material on the pipe wall is not a problem so long as the remainder of the purge dam is substantially removed to allow the free flow of material through the pipe.

It should be further noted that purge dams in accordance with the present invention need not comprise discrete adhesive and non-adhesive components. In particular, it would be possible to construct a self-adhesive purge dam according to the invention using a single laminate material that includes an adhesive layer. This laminate material could be formed into a desired purge dam configuration with the adhesive layer being outwardly oriented so as to be adherable to an interior pipe wall or other surface.

Figure 1:
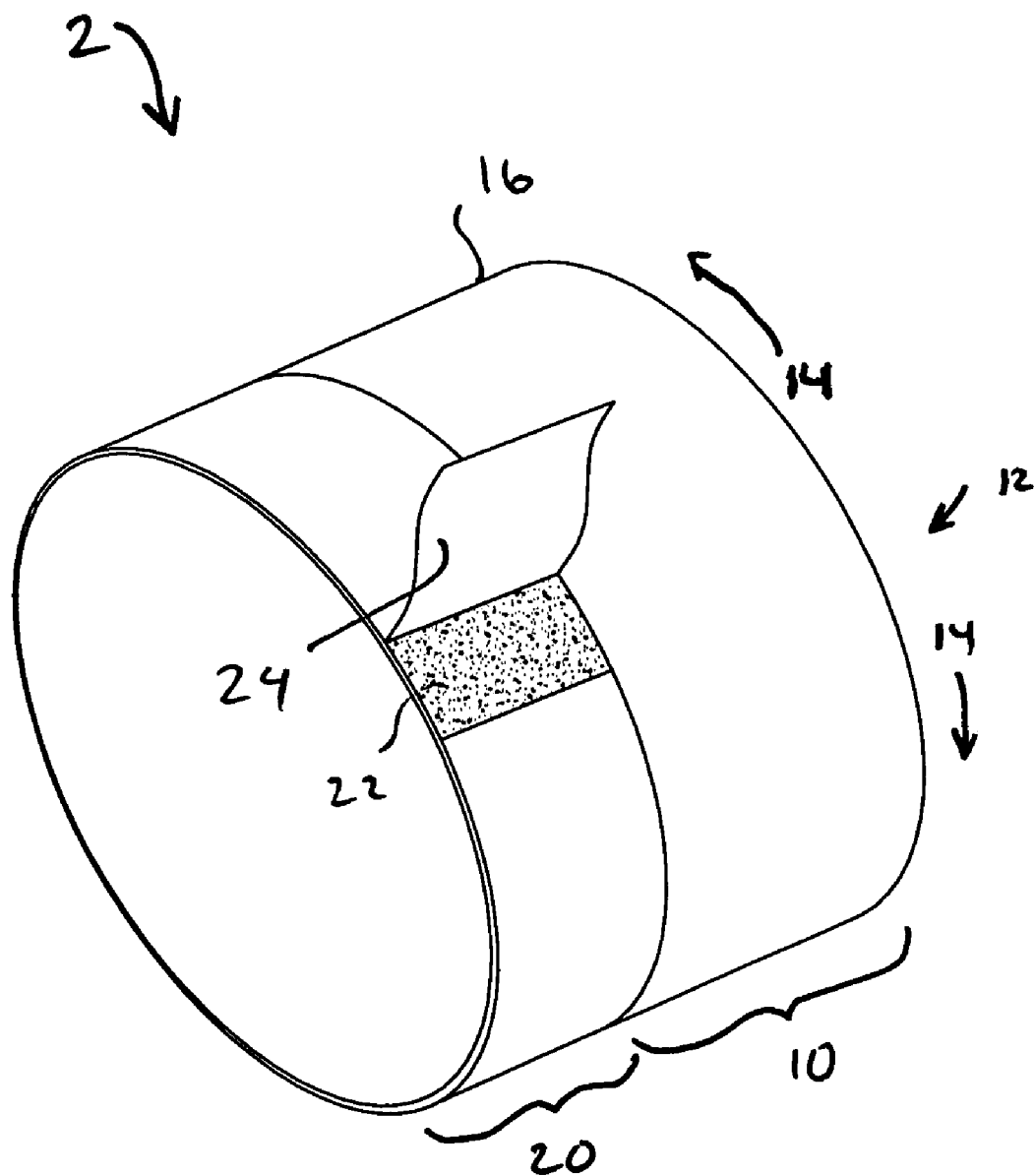
FIG. 1 is perspective view of a self-adhesive purge dam constructed in accordance with one exemplary embodiment of the invention.
Figure 2:
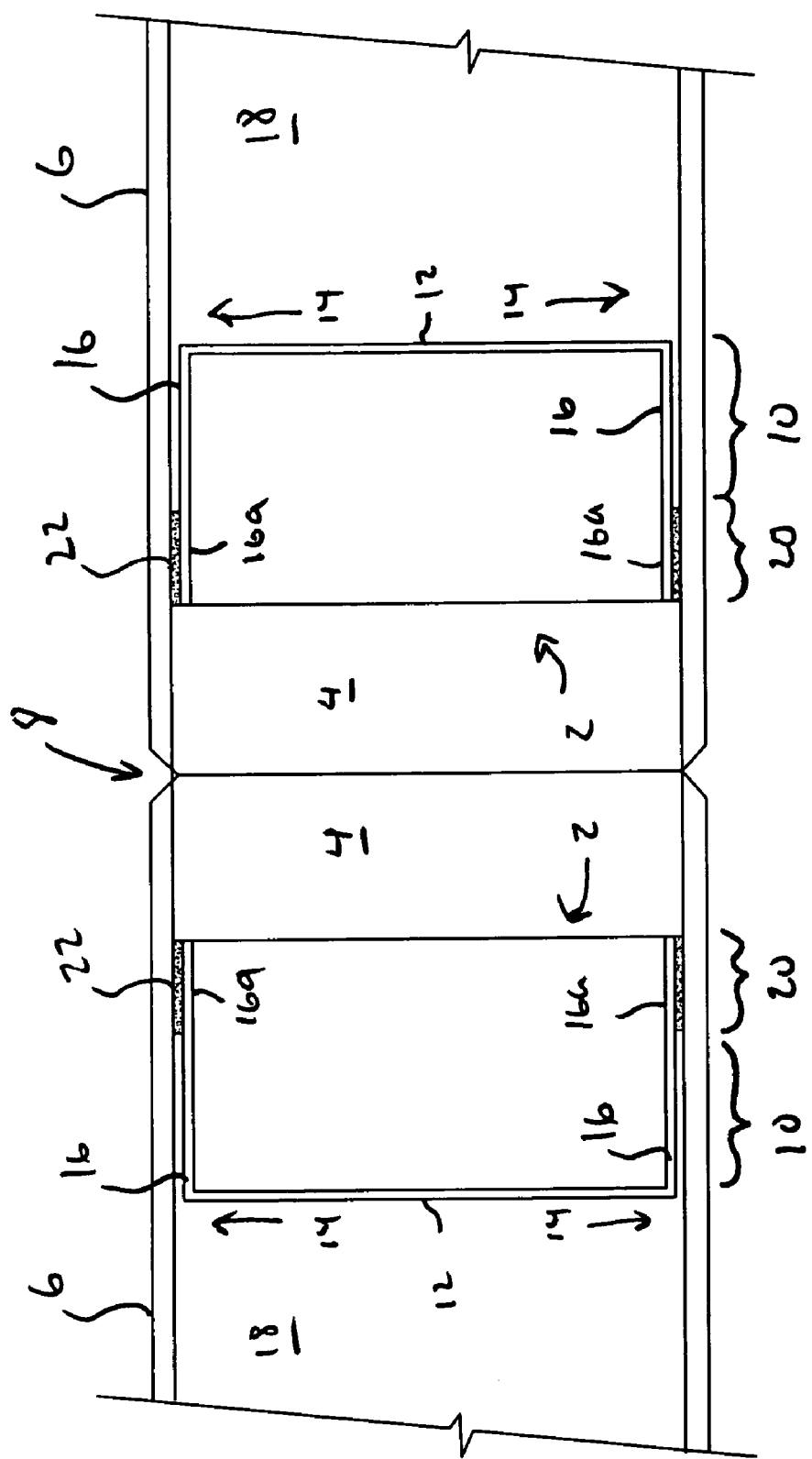
FIG. 2 is a cross-sectional centerline view of a pair of the purge dams of FIG. 1 installed around a weld zone.

Turning now to FIG. 1, a self-adhesive purge dam 2 according to one exemplary embodiment of the invention is illustrated. As additionally shown in FIG. 2, the purge dam 2 (in conjunction with a second purge dam 2 of like construction) is adapted for retaining a purge gas around a weld zone 4 within a pipe 6 or other structure to be welded. In FIG. 2, the weld zone is the area where the interfacing ends of a pair of pipes 6 are arranged to receive a circumferential butt weld at the location identified by reference numeral 8.

The purge dam 2 includes a base 10 that is substantially non-planar and generally tubular in shape. However, as will be seen from the discussion of additional embodiments hereinafter, other shapes, both planar and non-planar, can be used to construct a purge dam base. As best shown in FIG. 2, the base 10 of the current exemplary embodiment includes a central interior portion 12 that extends laterally outwardly at 14 to an outermost peripheral portion 16. The base 10 is configured to substantially obstruct an air passage 18 that leads to the weld zone 4. To that end, the peripheral portion 16 is generally tubular in shape and has a diameter that substantially corresponds to the inner diameter of the air passage 18, so as to facilitate blockage thereof. Although the air passage 18 represents the interior of the pipe 6 in FIG. 2, there may be other situations in which it is necessary to block an air passage that leads to a pipe weld zone, but wherein the air passage is not necessarily part of a pipe being welded. This could occur, for example, if there was a separate branch pipe (not shown) that opened to the weld zone 4 in FIG. 2. In that case, there might be one purge dam 2 in the branch pipe and two more purge dams 2 in the pipes 6 being welded. Although not shown, a small opening can be formed in the interior portion 12 of the base 10 of one or both purge dams 2 in order to provide an escape path for the release of ambient air that is displaced by purge gas introduced into the weld zone 4, and to control purge gas pressure.

The purge dam 2 further includes an adhesive skirt 20 configured to engage portions of the air passage 18. An adhesive 22 is provided on the adhesive skirt 20 for adhering the skirt. The adhesive 22 can either extend circumferentially continuously around the skirt 20 (as shown in FIG. 1) or can be placed at discrete locations (e.g., spot coated) around the skirt circumference. The adhesive 22 can be applied in liquid form via spraying, brushing, roll coating, dipping or the like onto an extension 16*a* of the peripheral portion 16 of the base 10. Alternatively, a double-sided adhesive member could be used. As additionally described hereinafter with reference to FIGS. 3 and 4, the adhesive 22 can also be provided by an adhesive strip that is mounted on the peripheral portion 16 of the base 10. Note that if the adhesive is sprayed on the purge dam, or if the purge dam is dipped in adhesive, manufacturing efficiencies may dictate that the adhesive 22 also be applied to some or all of the base 10, in addition to the skirt 20. Another situation where the adhesive 22 would cover the base 10 is if the entire purge dam is made of a laminate material that includes an adhesive layer, as mentioned above in regard to the selection of purge dam materials.

A removable backing 24 optionally covers the adhesive 22 until the purge dam 2 is ready to be installed. Cases where the adhesive backing 24 would not be required include constructions in which the purge dam 2 is placed in a protective enclosure, such as an envelope, pouch or other package. Another option is to use an adhesive 22 that can remain on the purge dam 2 in a dry state until it is wetted when adherence is required (like the adhesive on an envelope or postage stamp). Note that a wettable adhesive may preclude use of water soluble materials for the purge dam 2, unless a non-aqueous adhesive wetting agent can be used. It will thus be seen that there are various alternative means by which the adhesive 22 can be prevented from adhering until installation time.

When installation is desired, the purge dam 2 is prepared by peeling off the removable backing 24 (if present) or otherwise exposing or activating the adhesive 22 for adhesion. The purge dam 2 is then placed in the pipe 6 so that the skirt 20 faces the open end of the pipe (see FIG. 2), and the adhesive 22 is pressed against the sides of the air passage 18. Installing the two dams 2 of FIG. 2 in this manner allows the weld zone 4 to be sealed off from the ambient environment so that it can be purged of atmospheric contaminants (using conventional techniques).

Figure 3:
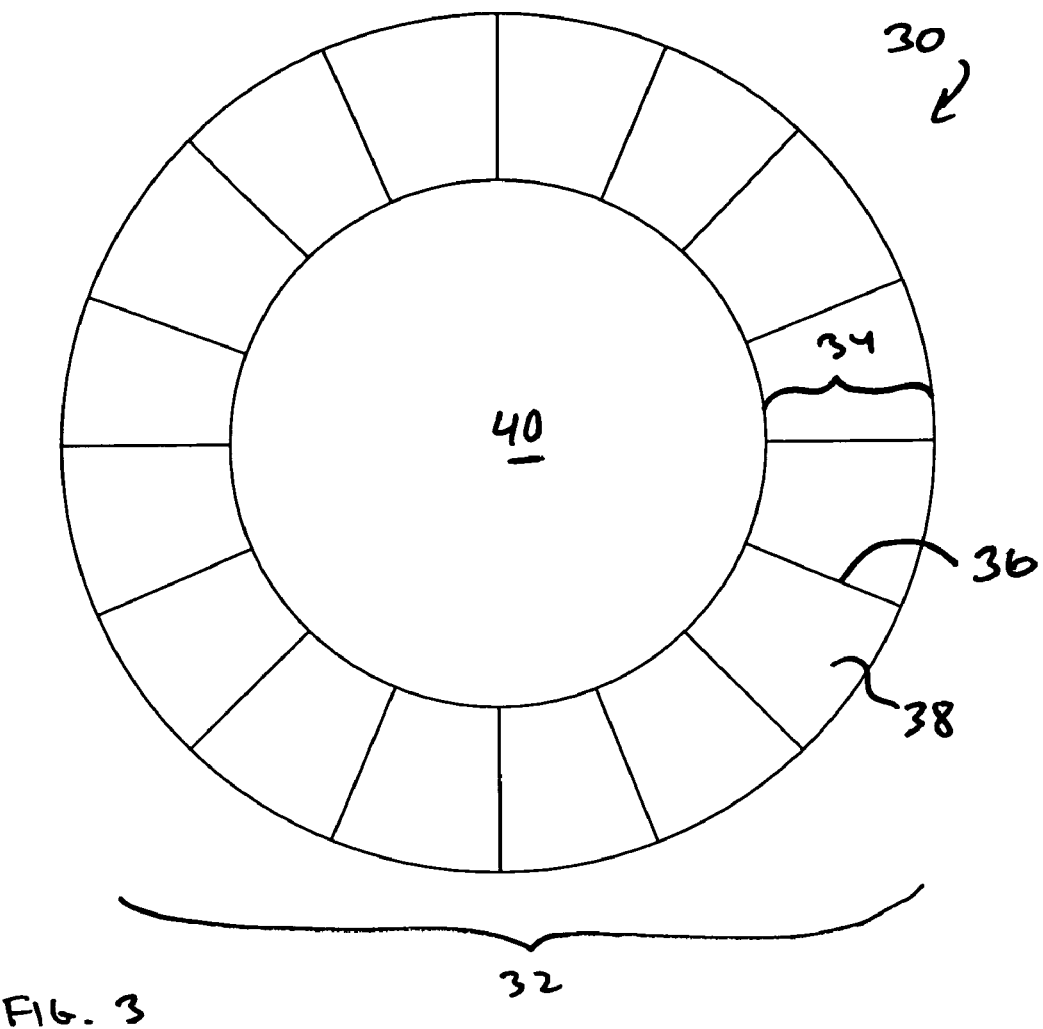
FIG. 3 is a plan view of a patterned material sheet prior to being shape-formed into a purge dam in accordance with the embodiment of FIG. 1.
Figure 4:
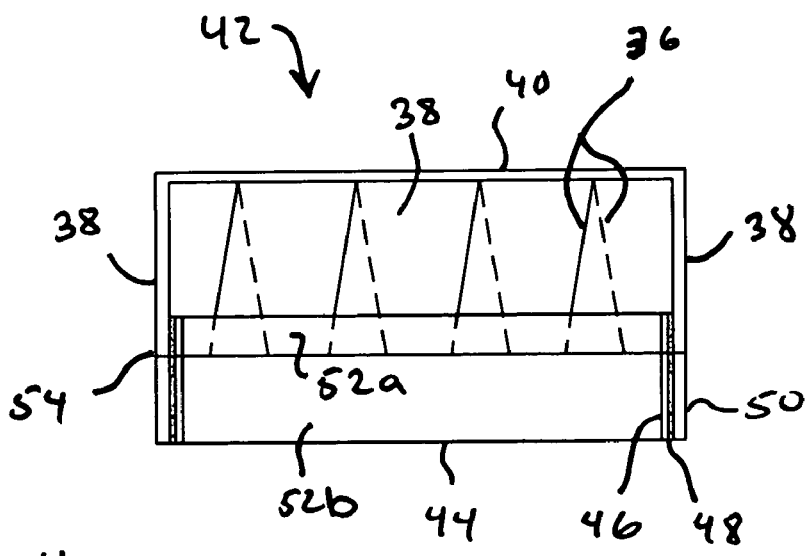
FIG. 4 is a cross-sectional centerline view of the patterned material sheet of FIG. 3 subsequent to shape forming thereof.

It will be appreciated that there are numerous ways in which the purge dam 2 could be constructed. FIGS. 3 and 4 illustrate one exemplary method that begins with the patterning of a planar material sheet 30 to facilitate the subsequent shape-forming of a non-planar article having the purge dam's generally tubular configuration. In FIG. 3, the patterned material sheet 30 is shaped as a generally circular disk 32. An outer annular portion 34 of the disk 32 is formed with a series of radial folds or creases 36 that define a plurality of flutes or pleats 38, each of which extends radially outwardly from an inner circular area 40. FIG. 4 shows the patterned material sheet 30 after it is shape-formed by folding the flutes or pleats 38 orthogonally relative to the circular area 40. This causes the folds or creases 36 to be gathered together, which produces a non-planar article 42 having the generally tubular shape of the purge dam 2. It will be appreciated that the foregoing procedure can be performed by hand or by way of automated means. In the latter case, a circular sheet of purge dam material could be pressed between a mold and a mandrel to obtain the desired non-planar shape.

In order to retain the non-planar article 42 in its generally tubular shape, an adhesive strip 44 is mounted around the inner side surfaces of the flutes or pleats 38. The adhesive strip 44 can be provided using a water soluble or non-water soluble pressure sensitive tape that includes a film substrate 46, a layer of adhesive 48 on the substrate, and a removable backing 50. The removable backing 50 is sliced or scored longitudinally to define first and second lateral edge portions 52*a* and 52*b* of the adhesive strip 44. To affix the adhesive strip 44 to the flutes or pleats 38, the removable backing 50 is peeled from the first lateral edge portion 52*a* of the adhesive strip 44 to expose the underlying adhesive 48. The lateral edge portion 52*a* is then adhered to the flute or pleat inner side surfaces that are adjacent to a terminal edge 54 of the non-planar article 42. The second lateral edge portion 52*b* of the adhesive strip 44 extends outwardly from the terminal edge 54, where it serves as the adhesive skirt 20 of the purge dam 2. This portion of the adhesive strip 44 will thus retain the removable backing 50 until installation time.

Figure 5:
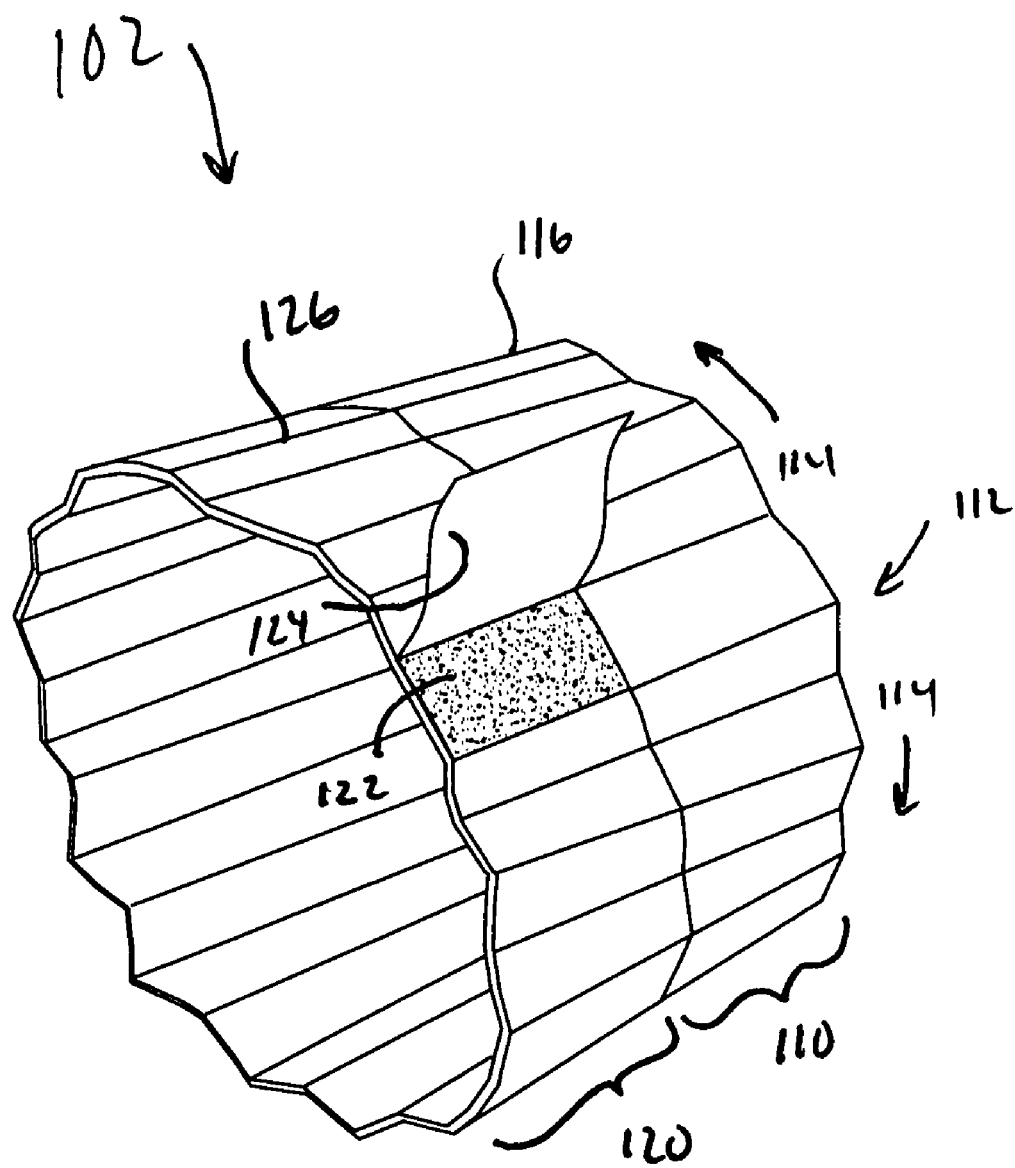
FIG. 5 is a perspective view of a purge dam according to another exemplary embodiment of the invention.
Figure 6A:
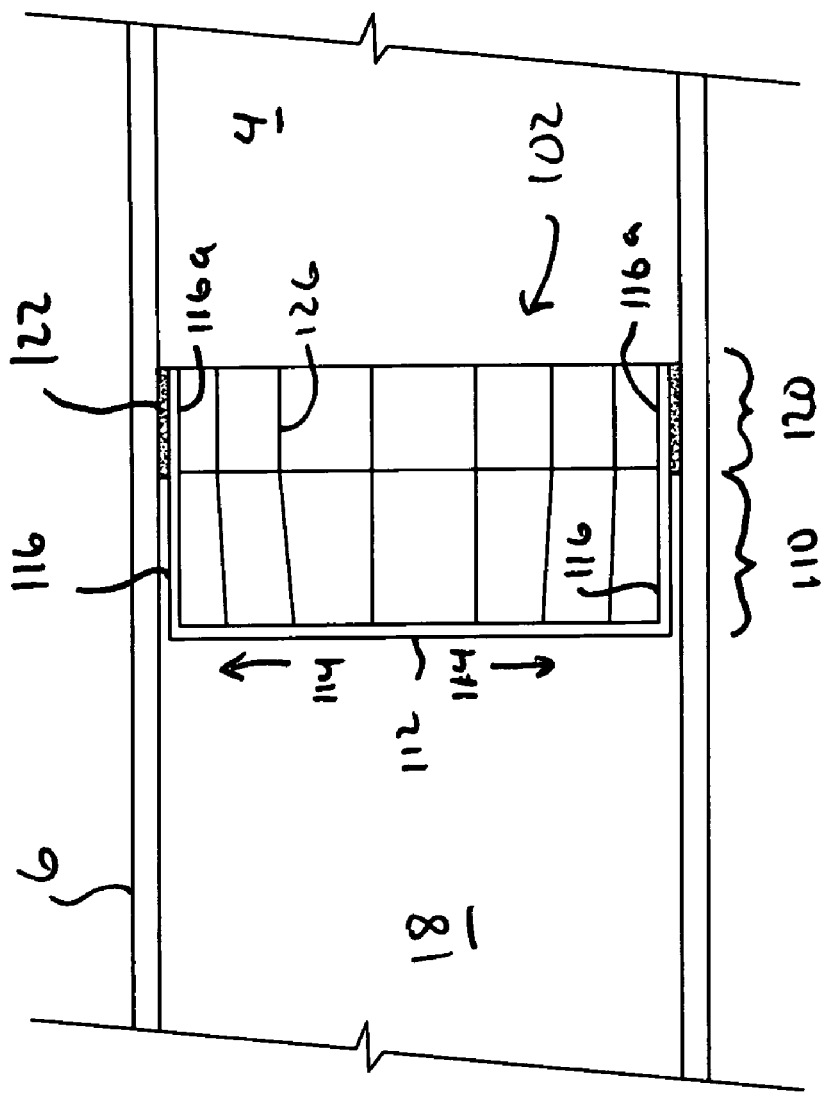
FIG. 6A is a cross-sectional centerline view of the purge dam of FIG. 5 installed at a weld zone in an air passage of relatively small size.
Figure 6B:
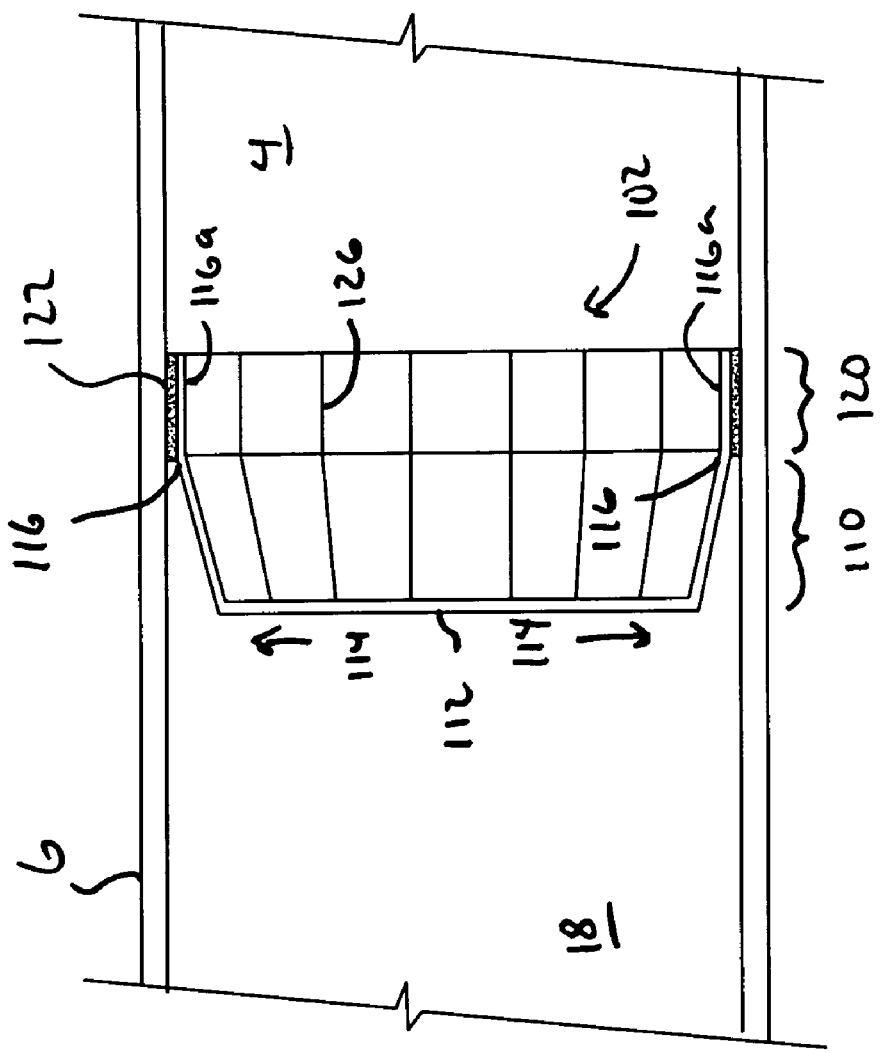
FIG. 6B is a cross-sectional centerline view of the purge dam of FIG. 5 installed at a weld zone in an air passage of relatively large size.

Turning now to FIGS. 5, 6A and 6B, a purge dam 102 represents a second exemplary embodiment of the present invention. The purge dam 102 includes a base 110 that is substantially non-planar and which can be variably shape-adjusted between generally tubular (see FIG. 6A) and generally frustoconical (see FIG. 6B) configurations. As best shown in FIGS. 6A and 6B, the base 110 has a central interior portion 112 that extends laterally outwardly at 114 to an outermost peripheral portion 116. The base 110 is configured to substantially obstruct the air passage 18 that leads to the weld zone 4. To that end, the base 110 has a fluted or pleated construction (see below) that allows the base portion 116 to be variably configured in order to facilitate the blockage of air passages 18 of different size. Although not shown, a small opening can be formed in the interior portion 112 of the base 110 in order to provide an escape path for the release of ambient air that is displaced by purge gas introduced into the weld zone 4, and to control purge gas pressure.

The purge dam 102 further includes an adhesive skirt 120 configured to engage portions of the air passage 18. An adhesive 122 is provided on the adhesive skirt 120 for adhering the skirt. The adhesive 122 can be formed using any of the previously described adhesive construction techniques. A removable backing 124 can be used to cover the adhesive 122 until the purge dam 102 is ready to be installed. As described above in connection with the embodiment of FIG. 1, the adhesive backing 124 is optional and may not be required for certain constructions.

When installation is desired, the purge dam 102 is prepared by peeling off the removable backing 124 (if present) or otherwise exposing or activating the adhesive 122 for adhesion. The purge dam 102 is then placed in the pipe 6 so that the skirt 120 faces the open end of the pipe. If the diameter of the pipe is larger or smaller than the skirt 120, the latter can be widened or narrowed due to the fluted or pleated construction of the purge dam 102. In particular, the skirt 120 and portions of the base 110 are formed with a plurality of flutes or pleats 126 that provide the desired size variability. FIG. 6A illustrates installation of the purge dam 102 in a smaller size pipe using a generally tubular configuration, while FIG. 6B illustrates installation in a larger size pipe using a generally frustoconical configuration. Once the purge dam 102 is in position with the skirt 120 being sized as desired, the adhesive 122 is pressed against the sides of the air passage 18. Installing two dams 102 in this manner allows the weld zone 4 to be sealed off from the ambient environment so that it can be purged of atmospheric contaminants (using conventional techniques).

Figure 7:
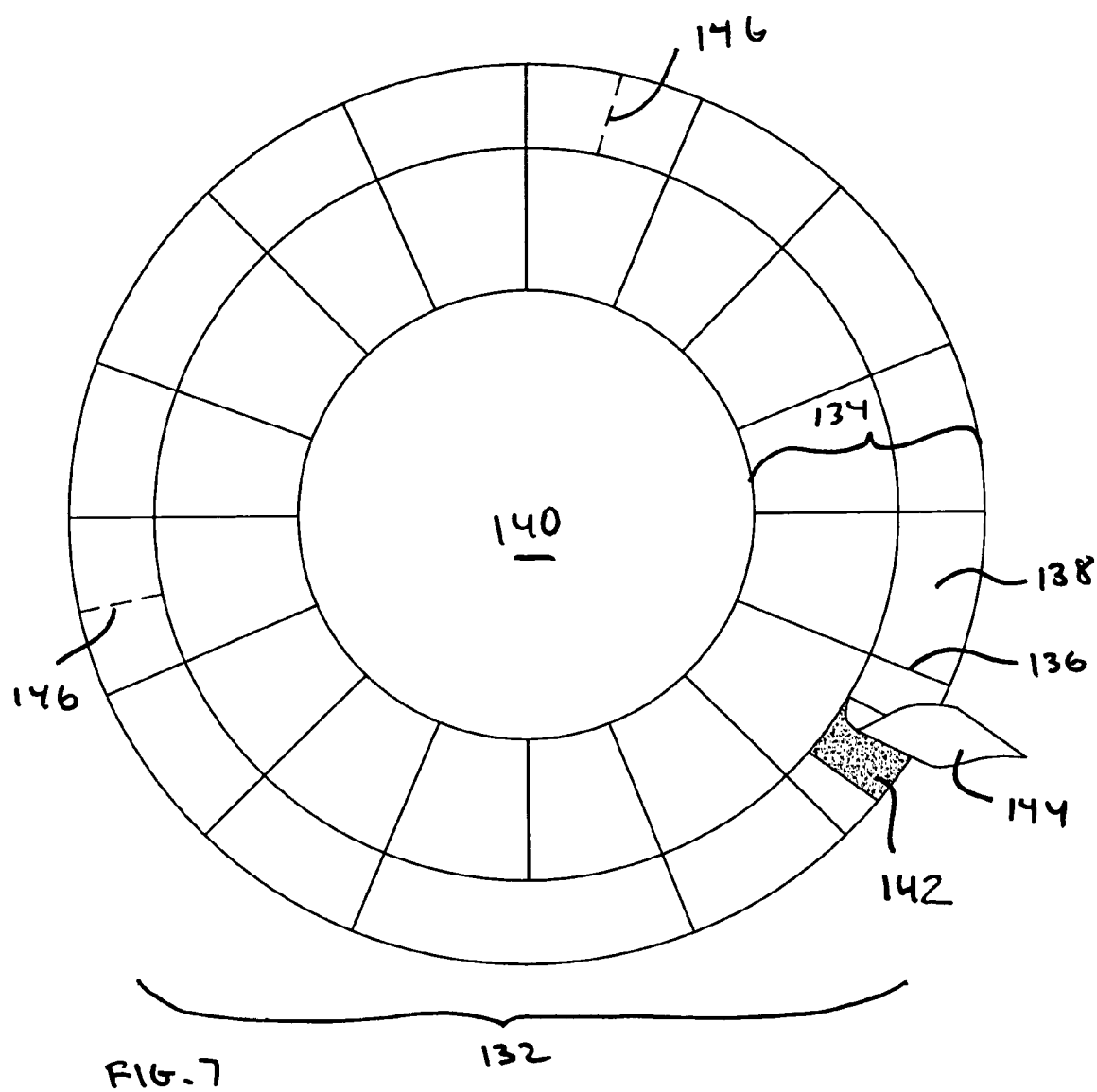
FIG. 7 is a plan view of a patterned material sheet prior to being shape-formed into a purge dam in accordance with the embodiment of FIG. 5.
Figure 8:
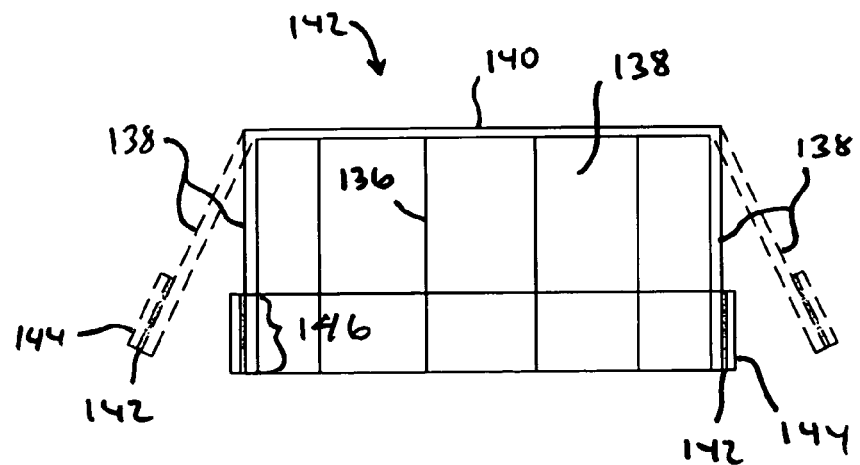
FIG. 8 is a cross-sectional centerline view of the patterned material sheet of FIG. 7 subsequent to shape forming thereof.

It will be appreciated that there are numerous ways in which the purge dam 102 could be constructed. FIGS. 7 and 8 illustrate one exemplary method that begins with the patterning of a planar material sheet 130 to facilitate the subsequent shape-forming of a non-planar article having the purge dam's generally tubular/frustoconical variable configuration. In FIG. 7, the patterned material sheet 130 is shaped as a generally circular disk 132. An outer annular portion 134 of the disk 132 is formed with a series of folds or creases 136 that define a plurality of flutes or pleats 138 extending from an inner circular area 140. An annular pattern of adhesive 142 is formed on the material sheet 130 using any of the adhesive construction techniques previously described, and this adhesive is optionally covered by a removable backing 144. Note that, if present, the removable backing 144 can be formed as a circumferentially continuous annular sheet, or it can be segmented by cutting or scoring, as shown by reference numerals 146, to facilitate its removal.

FIG. 8 shows the patterned material sheet 130 after it is shape-formed by folding the flutes or pleats 138 orthogonally to the circular area 140. This causes the folds or creases 136 to be gathered together, which produces a non-planar article 142 having the generally tubular/frustoconical variable shape of the purge dam 102. The adhesive 142 and the optional removable backing 144 will define the skirt 120 of the purge dam 102, along with a region 146 of the non-planar article 142 that carries the adhesive. If present, the removable backing 144 will remain on the adhesive 142 until installation time.

Figure 9:
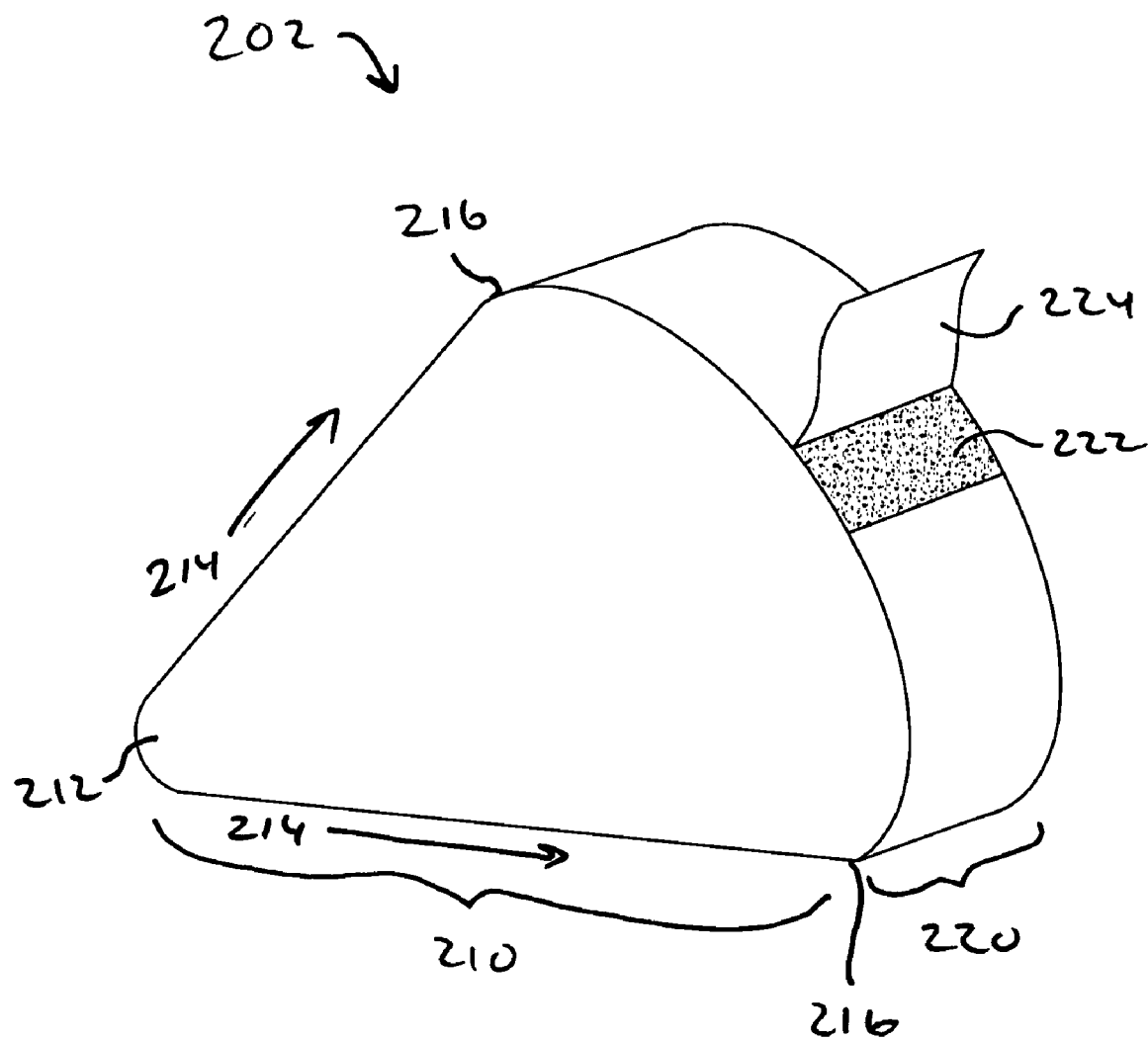
FIG. 9 is a perspective view of a purge dam according to another exemplary embodiment of the invention.
Figure 10:
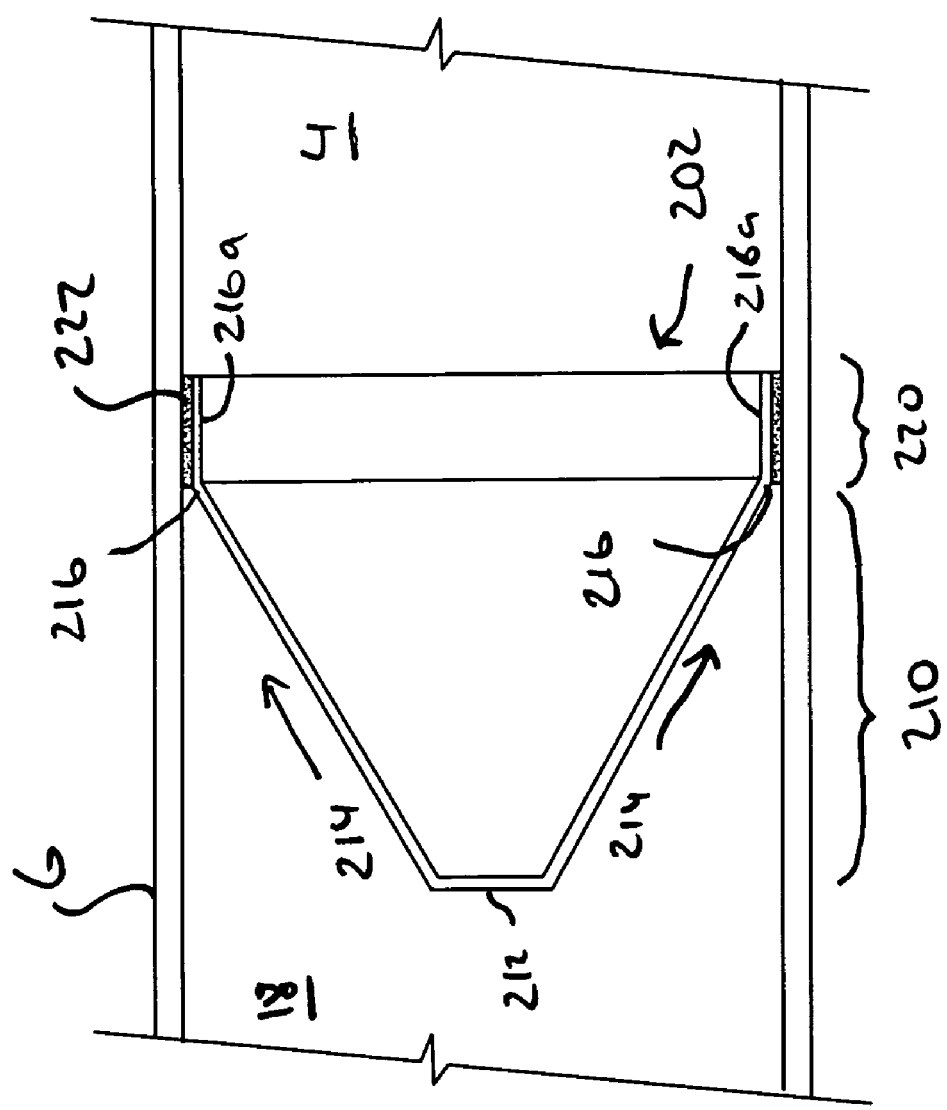
FIG. 10 is a cross-sectional centerline view of the purge dam of FIG. 9 installed at a weld zone in an air passage.

Turning now to FIGS. 9 and 10, a purge dam 202 represents a third exemplary embodiment of the present invention. The purge dam 202 includes a base 210 that is substantially non-planar and generally conical or frustoconical in shape. It has a central interior portion 212 that extends laterally outwardly at 214 to an outermost peripheral portion 216. The base 210 is configured to substantially obstruct an air passage 18 that leads to the weld zone 4 of FIG. 10. To that end, the peripheral portion 216 is generally circular in shape and has a diameter that substantially corresponds to the inner diameter of the air passage 18, so as to facilitate blockage thereof. Although not shown, a small opening can be formed in the interior portion 212 of the base 210 in order to provide an escape path for the release of ambient air that is displaced by purge gas introduced into the weld zone 4, and to control purge gas pressure.

The purge dam 202 further includes an adhesive skirt 220 configured to engage portions of the air passage 18. An adhesive 222 is provided on the adhesive skirt 220 for adhering the skirt. The adhesive 222 can be formed using any of the previously described adhesive construction techniques. A removable backing 224 covers the adhesive 222 until the purge dam 202 is ready to be installed. As described above in connection with the embodiment of FIG. 1, the adhesive backing 224 is optional and may not be required for certain constructions.

When installation is desired, the purge dam 202 is prepared by peeling off the removable backing 224 (if present) or otherwise exposing or activating the adhesive 222 for adhesion. The purge dam 202 is then placed in the pipe 6 so that the skirt 220 faces the open end of the pipe. Installing two purge dams 202 this manner allows the weld zone 4 to be sealed off from the ambient environment so that it can be purged of atmospheric contaminants (using conventional techniques).

Figure 11:
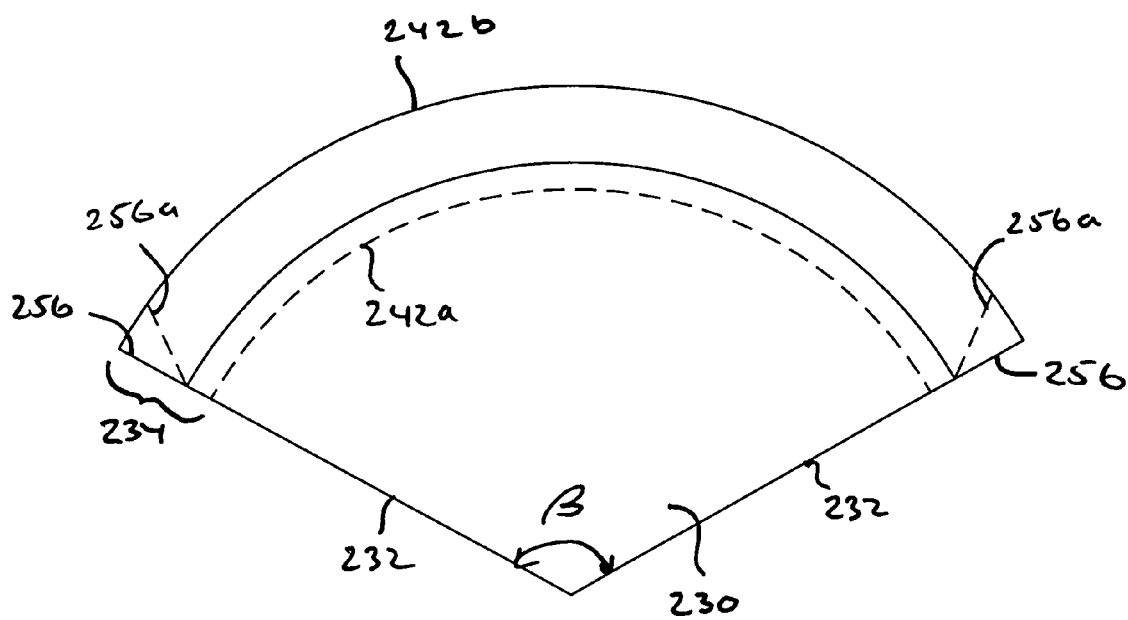
FIG. 11 a plan view of a patterned material sheet prior to being shape-formed into a purge dam in accordance with the embodiment of FIG. 9.
Figure 12:
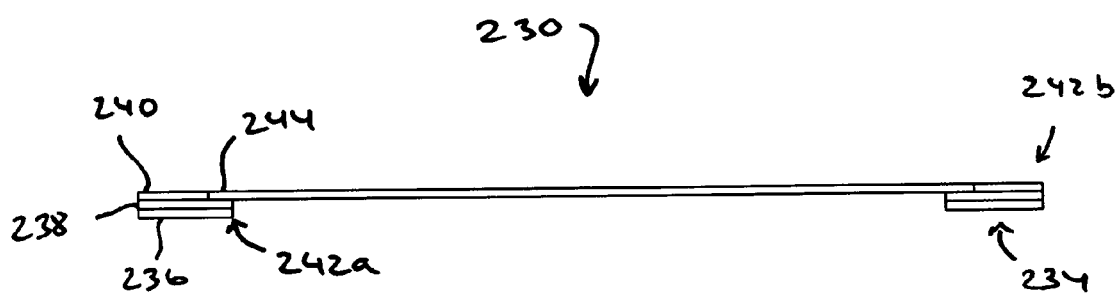
FIG. 12 is a side view of the patterned material sheet of FIG. 11.

It will be appreciated that there are numerous ways in which the purge dam 202 could be constructed. FIGS. 11 and 12 illustrate one exemplary method that begins with the patterning of a planar material sheet 230 to facilitate the subsequent shape-forming of the patterned material sheet into a non-planar article having the purge dam's generally conical or frustoconical configuration. In FIG. 11, the patterned material sheet 230 is shaped as a wedge having a pair of side edges 232 separated by an acute angle $\beta$. The angle $\beta$ could also be obtuse. Prior to shape-forming the patterned material sheet 230, an adhesive member in the form of a curved adhesive strip 234 is mounted to the material sheet to provide the skirt 220. Alternatively, any of the previously described adhesive construction techniques may be used to provide the adhesive. As seen in FIG. 12, the adhesive strip 234 can be provided using a water soluble or non-water soluble pressure sensitive tape that includes a film substrate 236 having adhesive 238 on one side thereof and a removable backing 240 covering the adhesive. To affix the adhesive strip 234 to the patterned material sheet 230, the adhesive backing 240 is removed from a first lateral edge portion 242a of the adhesive strip 234 to expose the underlying adhesive 238. This lateral edge portion is adhered to an outer radial edge portion 244 of the patterned material sheet 30. A second lateral edge portion 242b of the adhesive strip 234 extends radially outwardly from the patterned material sheet 230. This lateral edge portion of the adhesive strip 234 retains the adhesive backing 240 until installation time.

Figure 13:
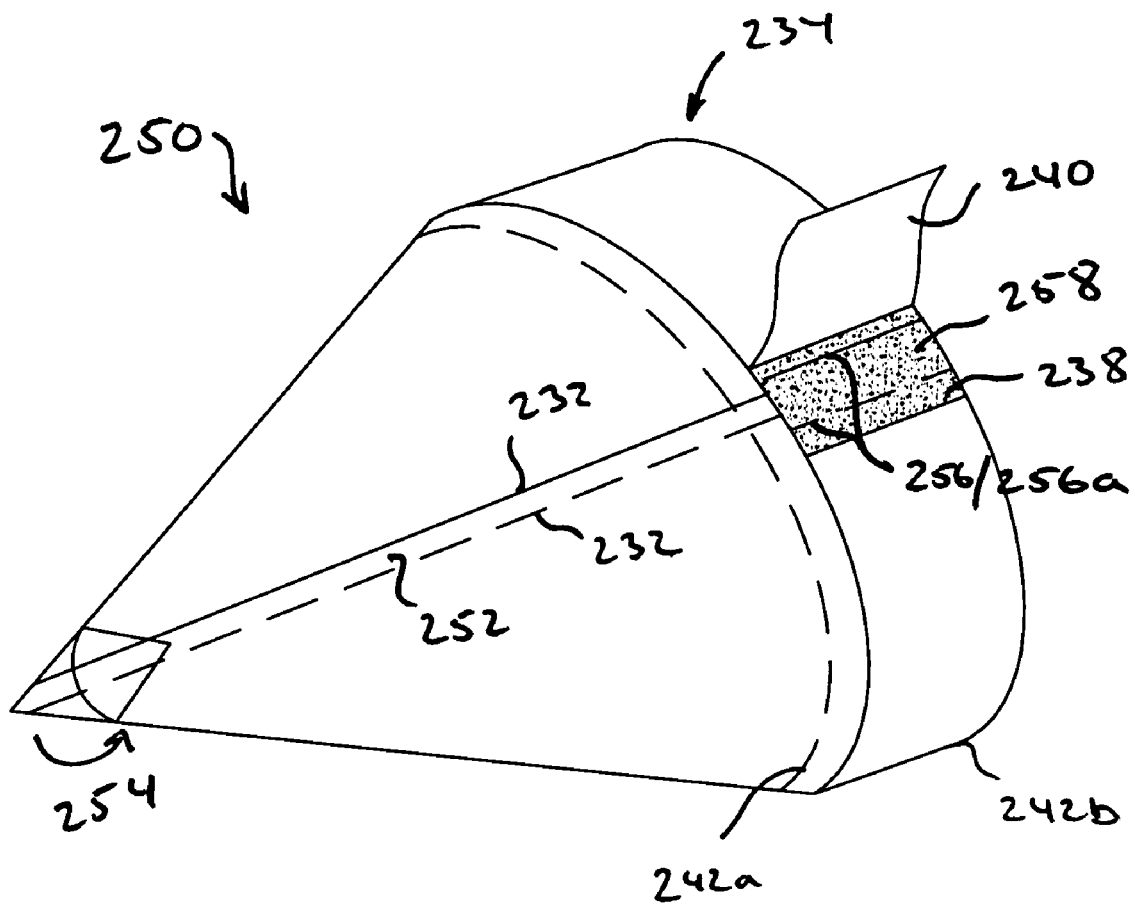
FIG. 13 is a perspective view of the patterned material sheet of FIG. 11 subsequent to shape forming thereof.

As shown in FIG. 13, the patterned material sheet 230 is now shape-formed to provide a non-planar cone-shaped article 250. This can be done by bending the material sheet to form an overlapping seam 252 and joining the side edges 232 together along the seam by adhesive bonding or the like. If desired, the pointed end of the cone-shaped article can be folded over as shown at reference numeral 254 to substantially close this end and thereby produce the generally frustoconical shape of the purge dam 202.

The final step in the construction process is to join together the side edges 256 of the adhesive strip 234 that correspond to the side edges 232 of the patterned material sheet 230 to form an overlapping seam 258. It is desirable (but not essential) to form the adhesive strip 234 into a generally tubular shape to facilitate engagement of the purge dam 202 to the tubular air passage 18. This can be done by pulling the side edges 256 of the adhesive strip 234 together to form the seam 258 so that it is wider than the seam 252. A tubular adhesive strip configuration could also be achieved by forming tapered edges 256a on the adhesive strip 234 (in lieu of the non-tapered edges 256). Both alternatives will tend to pull the adhesive strip 234 into a generally tubular shape, such that the skirt 220 is generally tubular, while the base 210 is generally conical or frustoconical.

It will be seen that the purge dam 202, if constructed in the foregoing manner, would comprise a skirt 220 that is formed by the adhesive strip 234 of FIG. 13. The first lateral edge portion 242a of the adhesive strip 234 (see FIG. 11) would be adhered lengthwise around the interior side of the peripheral portion 216 of the purge dam base 210. The second lateral edge portion of 242b of the adhesive strip 234 would extend beyond the peripheral portion 116 of the base 110 to define the purge dam skirt 220.

Figure 14:
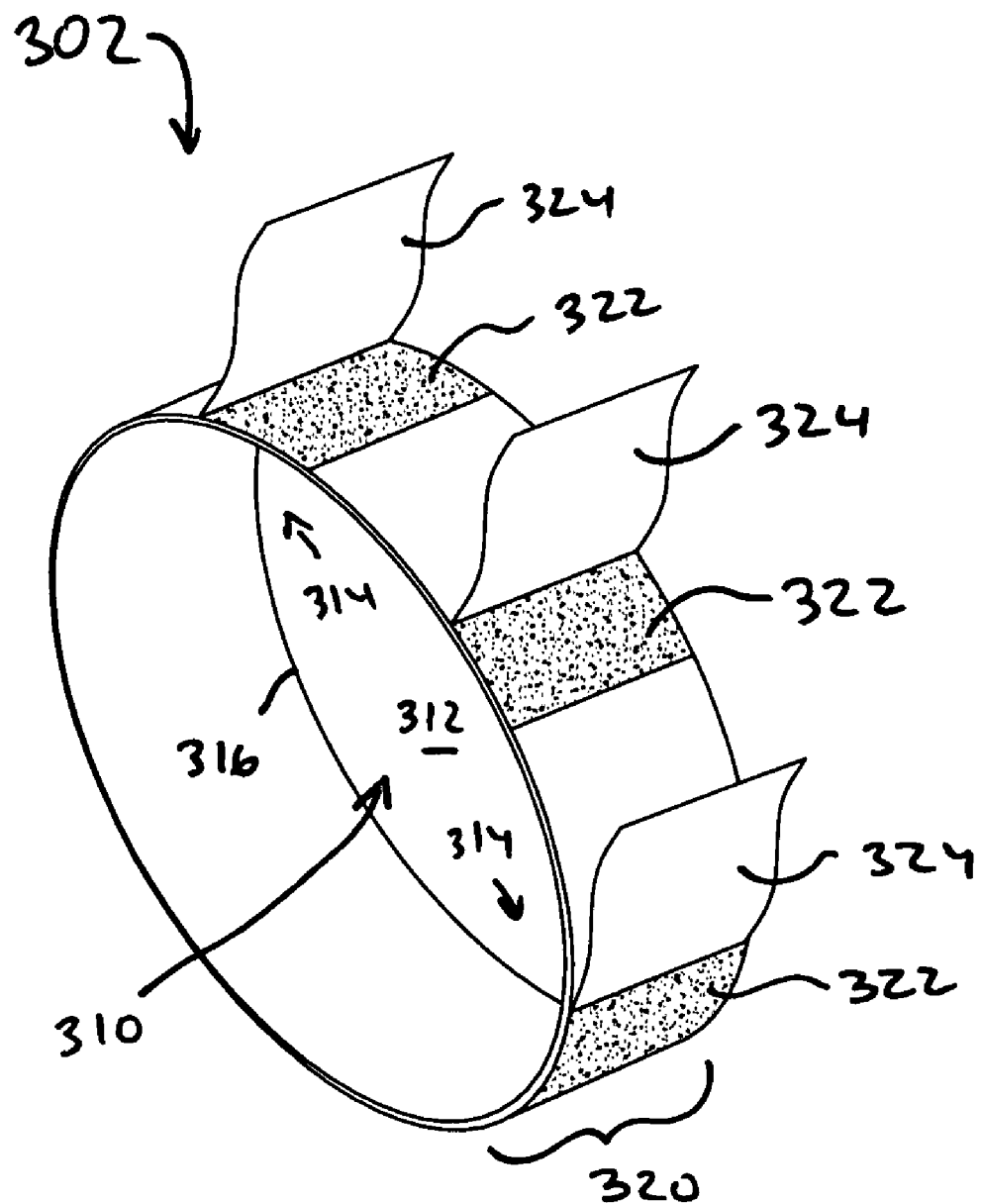
FIG. 14 is a perspective view of a purge dam according to a modification of the purge dam of FIG. 1.

Turning now to FIG. 14, a purge dam 302 represents a modified version of the purge dam 2 of FIG. 1. The purge dam 302 differs from the purge dam 2 in that the base 310 is a substantially planar, disk-shaped material sheet. The interior portion 312, the outwardly extending portion 314, and the outermost peripheral portion 316 thus all lie in the same plane. The skirt 320 extends from the planar base 310 at an oblique (i.e., orthogonal) angle. To facilitate installation of the purge dam 302, the skirt 320 is constructed so that portions thereof can be selectively adhered to the sides of an air passage in which the purge dam is installed. To that end, the skirt's adhesive 322 is either covered with plural removable backing 302 members that can be selectively removed, or the adhesive 322 is provided at discrete locations around the skirt, with each location being covered by a discrete removable backing 302. As in previous embodiments, the adhesive 322 and the removable backing 324 of the skirt 320 can be formed by way of an adhesive strip that is mounted to the peripheral portion 316 of the base 310, or by using any other suitable adhesive construction. Moreover, instead of a removable backing 302, a wettable adhesive could be used.

Figure 15:
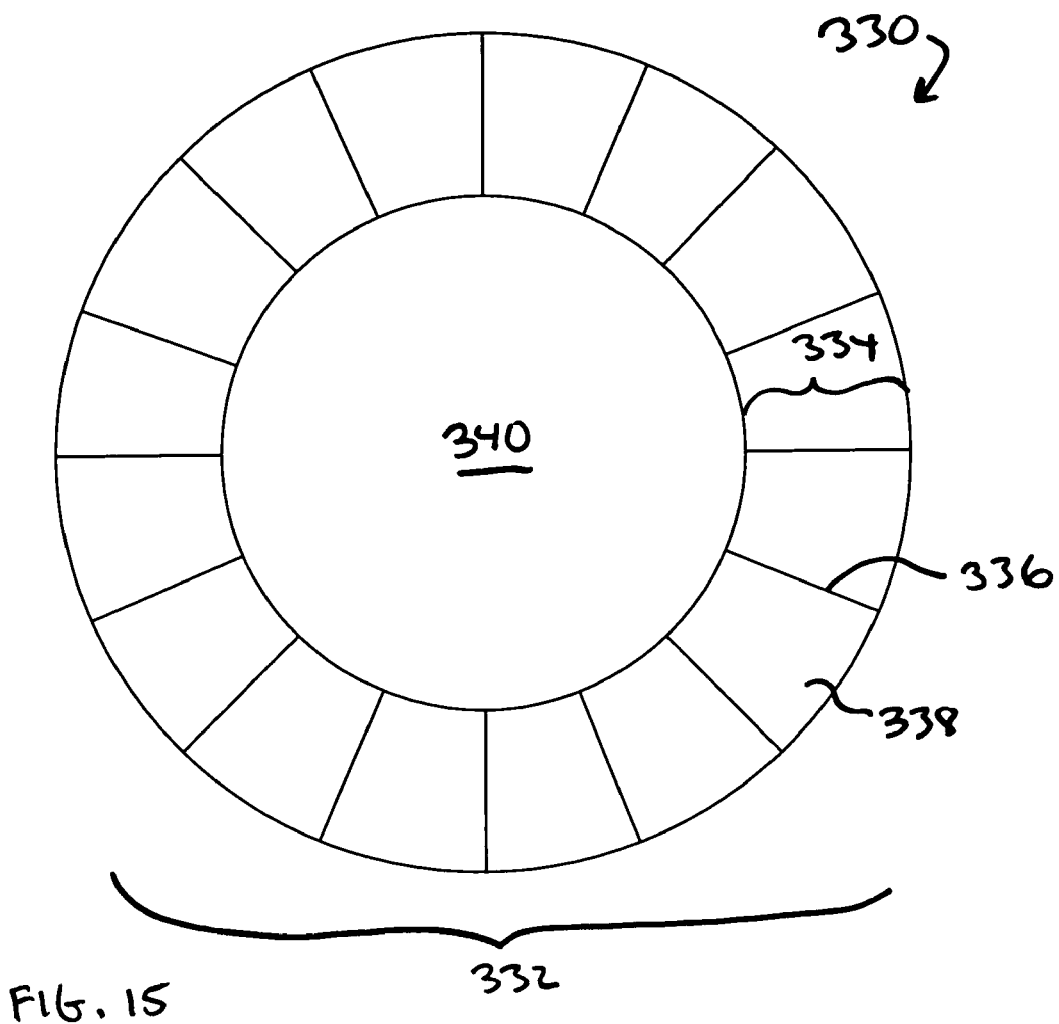
FIG. 15 is a plan view of a patterned material sheet prior to being shape-formed into a purge dam in accordance with FIG. 14.
Figure 16:
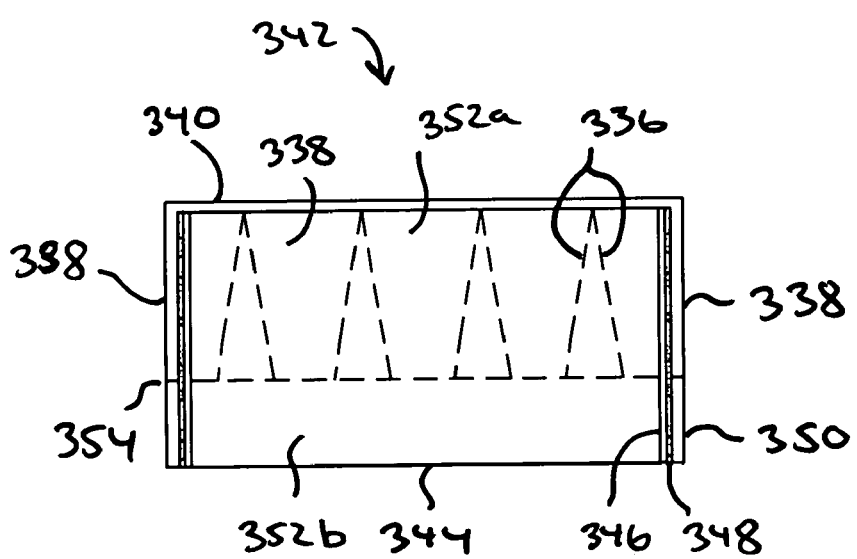
FIG. 16 is a cross-sectional centerline view of the patterned material sheet of FIG. 15 subsequent to shape forming thereof.

It will be appreciated that there are numerous ways in which the purge dam 302 could be constructed. FIGS. 15 and 16 illustrate one exemplary method that begins with the patterning of a planar material sheet 330 to facilitate the subsequent shape-forming of a non-planar article having the purge dam's generally tubular configuration. In FIG. 15, the patterned material sheet 330 is shaped as a generally circular disk 332. An outer annular portion 334 of the disk 332 is formed with a series of radial slits 336 that define a plurality of flaps 338, each of which extends radially outwardly from an inner circular area 340. FIG. 16 shows the patterned material sheet 330 after it is shape-formed by folding the flaps 338 orthogonally relative to the circular area 340. This causes the flaps 336 to be gathered together, which produces a non-planar article 342 having the generally tubular shape of the purge dam 302. It will be appreciated that the foregoing procedure can be performed by hand or by way of automated means. In the latter case, a circular sheet of purge dam material could be pressed between a mold and a mandrel to obtain the desired non-planar shape.

In order to retain the non-planar article 342 in its generally tubular shape, an adhesive strip 344 is mounted around the inner side surfaces of the flaps 338 so as to completely cover the same and provide a purge gas impermeable barrier. The adhesive strip 344 can be provided using one or more lengths of a water soluble or non-water soluble pressure sensitive tape that each include a film substrate 346, a layer of adhesive 348 on the substrate, and a single or segmented removable backing 350. The removable backing 350 is sliced or scored longitudinally to define first and second lateral edge portions 352a and 352b of the adhesive strip 344. To affix the adhesive strip 344 to the flaps or pleats 38, the removable backing 350 is peeled from the first lateral edge portion 352a of the adhesive strip 344 to expose the underlying adhesive 348. The lateral edge portion 352a is then adhered to the flap inner side surfaces from their origin at the circular area 340 to a terminal edge 354 of the non-planar article 342. The second lateral edge portion 352b of the adhesive strip 344 extends outwardly from the terminal edge 354, where it serves as the adhesive skirt 320 of the purge dam 302. This portion of the adhesive strip 344 will thus retain the removable backing 350 until installation time.

Figure 17:
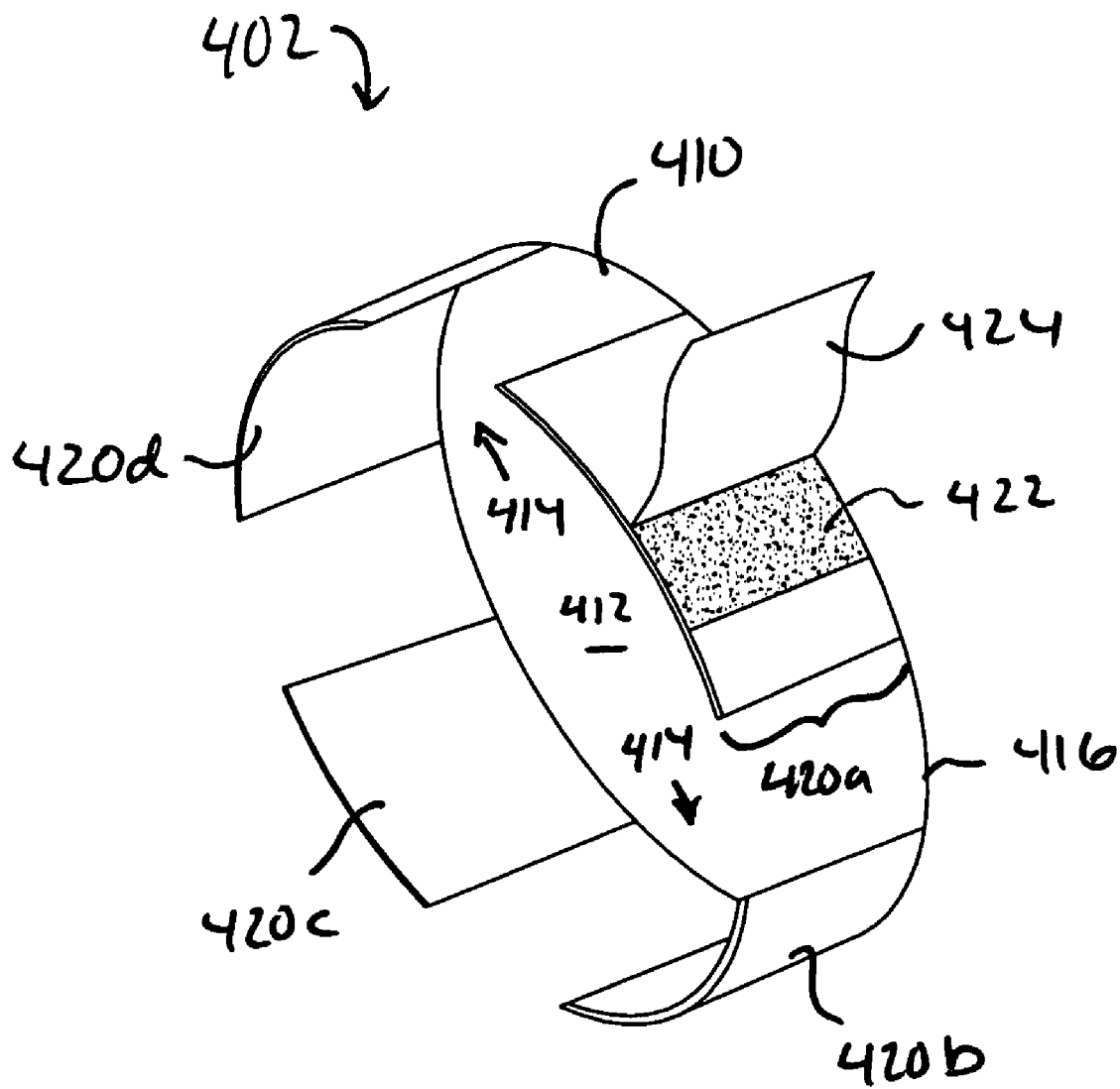
FIG. 17 is a perspective view of a purge dam according to another modification of the purge dam of FIG. 1.

Turning now to FIG. 17, a purge dam 402 represents another modified version of the purge dam 2 of FIG. 1. The purge dam 402 differs from the purge dam 2 in that the base 410 is a substantially planar, disk-shaped material sheet, and the skirt 420 is segmented. The interior portion 412, the outwardly extending portion 414, and the outermost peripheral portion 416 of the base 410 all lie in the same plane. The skirt 420 is formed by four discrete skirt members 420a, 420b, 420c and 420d that are spaced from each other and extend from the planar base 410 at an oblique (i.e., orthogonal) angle thereto. As described above in connection with previous embodiments, the adhesive 422 and the removable backing 424 of the skirt members 420a–d can be formed by way of adhesive strips that are mounted to the peripheral portion 416 of the base 410, or using any other suitable adhesive construction. Moreover, instead of a removable backing 424, a wettable adhesive could be used.

Figure 18:
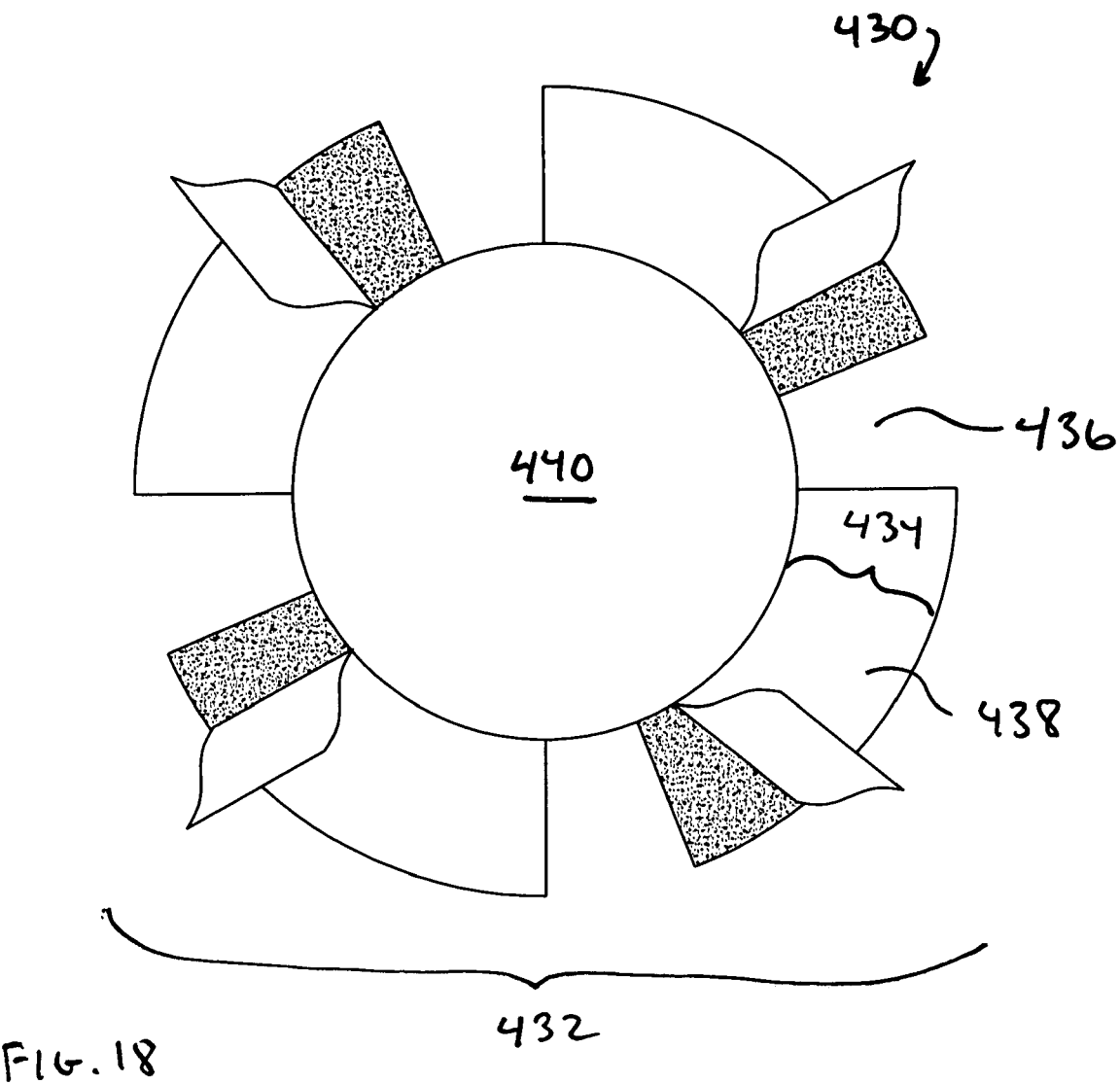
FIG. 18 is a plan view of a patterned material sheet prior to being shape-formed into a purge dam in accordance with FIG. 17.
Figure 19:
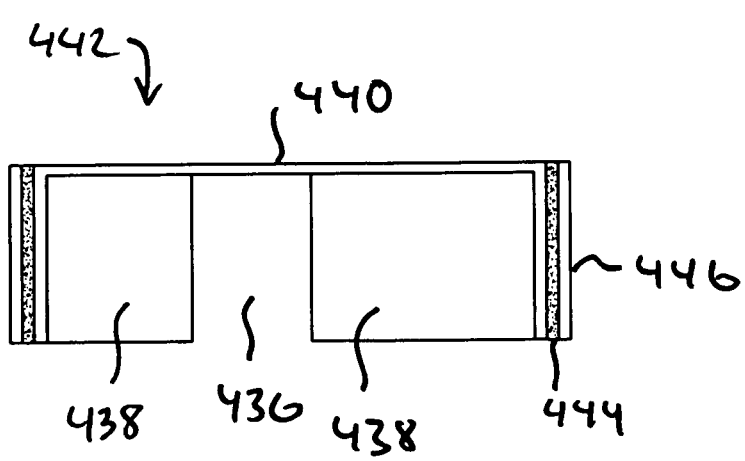
FIG. 19 is a cross-sectional centerline view of the patterned material sheet of FIG. 18 subsequent to shape forming thereof.

It will be appreciated that there are numerous ways in which the purge dam 402 could be constructed. FIGS. 18 and 19 illustrate one exemplary method that begins with the patterning of a planar material sheet 430 to facilitate the subsequent shape-forming of a non-planar article having the purge dam's generally tubular configuration. In FIG. 18, the patterned material sheet 430 is shaped as a generally circular disk 432. An outer annular portion 434 of the disk 432 is formed with a series of radial gaps 436 that define a plurality of segments 438, each of which extends radially outwardly from an inner circular area 440. FIG. 19 shows the patterned material sheet 430 after it is shape-formed by folding the segments 438 orthogonally relative to the circular area 440. This produces a non-planar article 442 having the generally tubular segmented shape of the purge dam 402. It will be appreciated that the foregoing procedure can be performed by hand or by way of automated means. In the latter case, a circular sheet of purge dam material could be pressed between a mold and a mandrel to obtain the desired non-planar shape.

An adhesive 444 is provided on the segments 438. One way the adhesive 444 could be provided is to form the segments 438 using adhesive strips that are adhered to the circular area 440. Alternatively, the adhesive 444 could be provided by spraying, brushing, roll coating, dipping or using any other suitable adhesive construction. Note that the adhesive 444 can be provided either prior to or after formation of the planar material sheet 430 into the non-planar article 442. An optional removable backing 446 can be applied to the adhesive 444.

Figure 20:
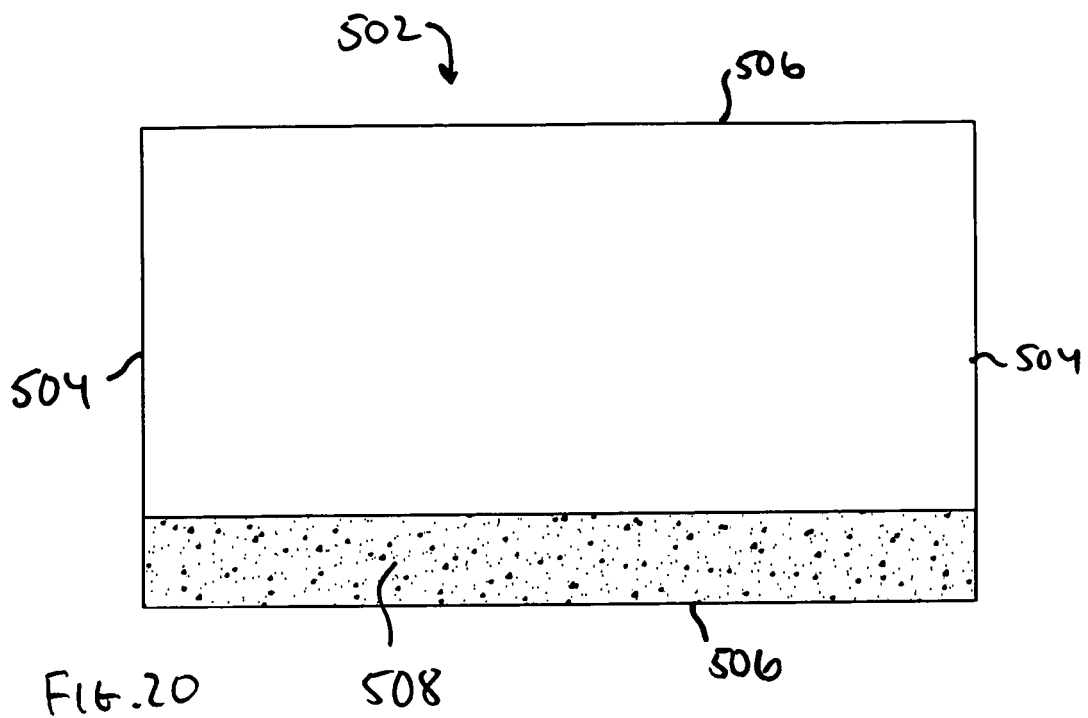
FIG. 20 is a plan view of a patterned material sheet prior to being shape-formed into a purge dam according to another exemplary construction technique.
Figure 21:
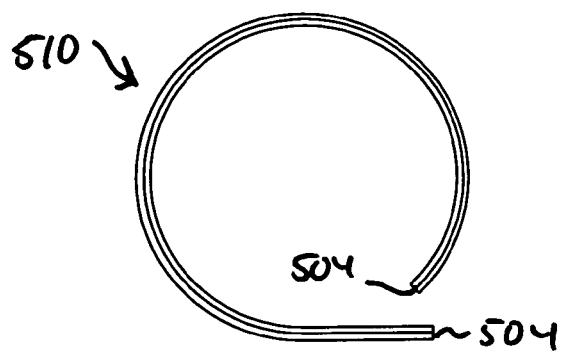
FIG. 21 is an end view of the patterned material sheet of FIG. 20 as it is being shape-formed into a non-planar article.
Figure 22:
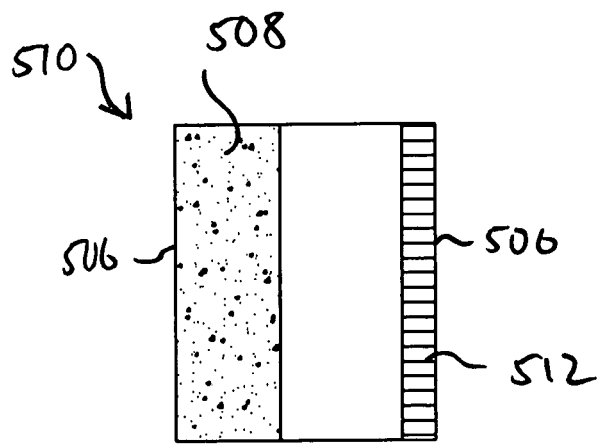
FIG. 22 is a side view of the completed non-planar article of FIG. 21.

Turning now to FIGS. 20–22, one final purge dam construction example is shown. This example is similar to the construction technique of FIGS. 11 and 12 except that a generally tubular purge dam is produced instead of a conical or frustoconical configuration. The construction begins with the selection of a generally rectangular planar material sheet 502, as shown in FIG. 20. The patterned material sheet 502 has a pair of first side edges 504, and a pair of second side edges 506. Prior to or after shape-forming the patterned material sheet 502, an adhesive 508 is provided along one of the edges 506. Any of the previously described adhesive construction techniques may be used to provide the adhesive 508.

The patterned material sheet 502 is now shape-formed by rolling it to produce a non-planar tubular article 510. FIG. 21 shows the non-planar article 510 as it is being formed, while FIG. 21 illustrates the completed tubular configuration. The final step in the construction process is to join together the side edge 506 that is opposite the adhesive 508 to provide a closure for blocking purge gas. The closure can be formed by squeezing this end of the non-planar article 501 to form a seam 512 similar to that of a toothpaste tube. Other methods, such as folding this end of the non-planar article 501 to define a closure, could also be used. The opposite end of the non-planar article 510 can remain open. Alternatively, this end could also be closed.

Accordingly, a self-adhesive purge dam for inert gas welding has been disclosed. While various embodiments of the invention have been described, it should be apparent that many variations and alternative embodiments could be implemented in accordance with the teachings set forth herein. It will therefore be understood that the invention is not to be in any way limited except in accordance with the spirit of the appended claims and their equivalents.

I claim:

1. A self-adhesive weld zone purge dam for retaining purge gas around the weld zone, comprising:
    a base having a configuration that substantially obstructs an air passage leading to said weld zone;
    an adhesive skirt forming a periphery on said base and configured to engage portions of said air passage;
    adhesive on said adhesive skirt for adhering said skirt to said air passage; and
    a removable backing covering said adhesive;
    whereby said purge dam can be installed by removing said removable backing and exposing said adhesive for adhesion to said air passage.

2. A purge, dam in accordance with claim 1, wherein said weld zone comprises a junction of two pipes to be welded together.

3. A purge dam in accordance with claim 1, wherein said air passage comprises a pipe leading to said weld zone.

4. A purge dam in accordance with claim 1, wherein said base and said skirt comprise a water soluble material and said adhesive comprises one of a water soluble material and a non-water soluble material.

5. A purge dam in accordance with claim 1, wherein said base is generally non-planar.

6. A purge dam in accordance with claim 1, wherein said base is generally planar.

7. A purge dam in accordance with claim 1, wherein said base is generally tubular, conical or frustoconical.

8. A purge dam in accordance with claim 1, wherein said base is generally disk-shaped.

9. A purge dam in accordance with claim 1, wherein said base comprises a peripheral portion whose shape substantially conforms to a cross-sectional shape of said air passage.

10. A purge dam in accordance with claim 1, wherein said skirt extends from said base in parallel therewith.

11. A purge dam in accordance with claim 1, wherein said skirt extends from said base at a generally oblique angle thereto.

12. A purge dam in accordance with claim 1, wherein said skirt extends from said base at a generally orthogonal angle thereto.

13. A purge dam in accordance with claim 1, wherein said skirt comprises an adhesive strip that provides said adhesive.

14. A purge dam in accordance with claim 1, wherein said skirt comprises plural adhesive strips that provide said adhesive.

15. A purge dam in accordance with claim 1, wherein said skirt is substantially continuous.

16. A purge dam in accordance with claim 1, wherein said skirt is segmented.

17. A purge dam in accordance with claim 1, wherein said skirt is flexibly positionable so that said purge dam is adapted to accommodate different sizes of said air passage.

18. A purge dam in accordance with claim 1, wherein said skirt is pleated.

19. A purge dam in accordance with claim 1, wherein said adhesive comprises an adhesive strip that is adhered lengthwise around an interior peripheral portion of said base such that a lateral edge portion of said strip extends beyond said peripheral portion of said base.

20. A purge dam in accordance with claim 1, wherein said adhesive comprises plural adhesive strips each having a first portion that is adhered to said base and a second portion that extends from said base.

21. A purge dam in accordance with claim 1, wherein said adhesive comprises adhesive material applied to an extension of said base.

22. A purge dam in accordance with claim 1, wherein said adhesive comprises a double-sided adhesive member applied to an extension of said base.

23. A purge dam in accordance with claim 1, wherein said adhesive backing comprises a peelable backing sheet.

24. A purge dam in accordance with claim 1, wherein said adhesive backing comprises plural peelable backing sheets.

25. A purge dam in accordance with claim 1, wherein said adhesive backing comprises a peelable backing sheet that is scored to define plural segments.

26. A purge dam in accordance with claim 1, wherein said base and said skirt are generally tubular.

27. A purge dam in accordance with claim 1, wherein said base and said skirt are variably tubular and frustoconical.

28. A purge dam in accordance with claim 1, wherein said base is generally conical or frustoconical and said skirt is generally tubular.

29. A purge dam in accordance with claim 1, wherein said base is generally planar and said skirt is generally tubular.

30. A purge dam in accordance with claim 1, wherein said base is generally planar and said skirt is generally segmented.

31. A method of fabricating a self-adhesive weld zone purge dam for retaining purge gas around the weld zone, comprising:
    patterning a planar material sheet to facilitate subsequent shape-forming of the patterned material sheet into a non-planar article;
    shape-forming said patterned material sheet to provide a non-planar article with a peripheral portion;
    either prior to or after shape-forming said patterned material sheet, applying adhesive and a removable adhesive backing to the peripheral portion of said patterned material sheet; and
    said non-planar article including:
    a base having a configuration that substantially obstructs an air passage leading to said weld zone;
    an adhesive skirt forming a peripheral portion on said base and configured to engage portions of said air passage;

adhesive on said skirt for adhering said skirt to said air passage; and a removable backing covering said adhesive;

whereby said purge dam can be installed by removing said removable backing and exposing said adhesive for adhesion to said air passage.

32. A method in accordance with claim 31, wherein said adhesive is applied to the peripheral portion prior to said shape-forming by applying one or more adhesive members having a removable adhesive backing to the peripheral portion of said patterned material sheet.

33. A method in accordance with claim 31, wherein said adhesive is applied to the peripheral portion prior to said shape-forming by applying a liquid adhesive to the peripheral portion of said patterned material sheet and placing a removable adhesive backing on said adhesive.

34. A method in accordance with claim 31, wherein said adhesive is applied to the peripheral portion prior to said shape-forming by applying a double-sided adhesive member to the peripheral portion of said patterned material sheet.

35. A method in accordance with claim 31, wherein said adhesive is applied to the peripheral portion after said shape-forming by applying one or more adhesive members having a removable adhesive backing to the peripheral portion of said non-planar article.

36. A method in accordance with claim 31, wherein said adhesive is applied to the peripheral portion after said shape-forming by applying a liquid adhesive to the peripheral portion of said non-planar article and placing a removable adhesive backing on said adhesive.

37. A method in accordance with claim 31, wherein said adhesive is applied to the peripheral portion after said shape-forming by applying a double-sided adhesive member to the peripheral portion of said non-planar article.

38. A method in accordance with claim 31, wherein said patterning comprises configuring said planar material sheet in a generally circular pattern having an outer annular peripheral portion sectioned into individual radially extending flaps or pleats, and wherein said shape-forming comprises bending said flaps or pleats out-of-plane and securing them together to form a non-planar article that is generally tubular in shape.

39. A method in accordance with claim 38, wherein said adhesive is applied to the peripheral portion after said shape-forming as an adhesive strip that is adhered lengthwise around an interior peripheral portion of said non-planar article to secure together said flaps or pleats.

40. A method in accordance with claim 31, wherein said patterning comprises configuring said planar material sheet in a generally circular pattern, and wherein said shape-forming comprises forming one or more flutes or pleats in an outer annular peripheral portion of said pattern and bending said fluted or pleated portion of said pattern out-of-plane to form a non-planar article that is variably generally tubular or frustoconical.

41. A method in accordance with claim 40, wherein said adhesive is applied to the peripheral portion prior or following said shape-forming as one of a liquid adhesive, a double-sided adhesive member or an adhesive strip that is adhered lengthwise around a peripheral portion of said patterned material sheet or said shaped article.

42. A method in accordance with claim 31, wherein said patterning comprises configuring said planar material sheet in a wedge other partial circular pattern, and wherein said shape-forming comprises bending and joining together two sides of said pattern to form a non-planar article that is generally conical or frustoconical in shape.

43. A method in accordance with claim 42, wherein said adhesive is applied to the peripheral portion prior to or following said shape-forming as one of a liquid adhesive, a double-sided adhesive member or an adhesive strip that is adhered lengthwise around a peripheral portion of said planar material sheet or said shaped article.

44. A method of fabricating a self-adhesive weld zone purge dam for retaining purge gas around the weld zone, comprising:

patterning a planar material sheet defining a base portion having a configuration to substantially obstruct an air passage leading to said weld zone;

attaching an adhesive skirt to a periphery of said base portion of said patterned material sheet;

said skirt being configured to engage portions of said air passage; and said skirt having adhesive and a removable adhesive backing covering said adhesive;

whereby said purge dam can be installed by removing said removable backing and exposing said adhesive for adhesion to said air passage.

45. A method in accordance with claim 44 wherein said skirt comprises one or more adhesive strips having an adhesive backing thereon.

46. A method for installing a purge dam for retaining purge gas around the weld zone, comprising:

selecting a self-adhesive purge dam having an adhesive skirt forming a periphery on a base portion of said purge dam and forming an adhesive layer with a removable backing covering said adhesive layer;

said purge dam being sized to substantially block an air passage leading to said weld zone;

removing said backing from said adhesive;

placing said purge dam in said air passage; and adhering said adhesive to portions of said air passage.

47. A self-adhesive weld zone purge dam for retaining purge gas around the weld zone, comprising:

a laterally interior base portion extending to a laterally peripheral portion and having a configuration that substantially obstructs an air passage leading to said weld zone;

adhesive on said peripheral portion for adhering said peripheral portion to said air passage; and means for preventing adhesion of said adhesive to said air passage prior to installation;

whereby said purge dam can be installed by adhering said adhesive to said air passage.

* * * * *